United States Patent [19]
Beagley et al.

[11] Patent Number: 5,486,053
[45] Date of Patent: Jan. 23, 1996

[54] BEARING UNIT FOR A VEHICLE WHEEL

[75] Inventors: Thomas Beagley, La Membrolle Sur Choisille, France; Hendrikus J. Kapaan, Nieuwegein; Leslie Berryman, Vianen, both of Netherlands; Olivier Message, Tours, France

[73] Assignee: SKF Industrial Trading & Development Company B.V., Nieuwegein, Netherlands

[21] Appl. No.: 32,809

[22] Filed: Mar. 17, 1993

[30] Foreign Application Priority Data

Mar. 19, 1992 [NL] Netherlands ............................ 9200511

[51] Int. Cl.$^6$ ............................ F16C 33/64; B60K 17/30
[52] U.S. Cl. ...................... 384/513; 301/105.1; 384/544; 464/178
[58] Field of Search ...................... 464/178, 906, 464/145; 384/449, 510, 513, 515, 537, 542, 543, 544, 585; 301/105.1, 124.1

[56] References Cited

U.S. PATENT DOCUMENTS

| 3,633,982 | 1/1972 | Germann | 384/515 |
| 3,767,221 | 10/1973 | Asberg | 280/96.1 |
| 3,971,604 | 7/1976 | Kapaan | 384/513 |
| 4,129,345 | 12/1978 | Krude | 301/105.1 X |
| 4,383,588 | 5/1983 | Krude | 384/537 X |
| 4,529,254 | 7/1985 | Krude | 464/178 X |
| 5,115,746 | 5/1992 | Scarpatetti | 301/105.1 X |

FOREIGN PATENT DOCUMENTS

| 2233885 | 1/1975 | France . | |
| 2305311 | 10/1976 | France . | |
| 2371601 | 6/1978 | France . | |
| 2539079 | 7/1984 | France | 301/105.1 |
| 0343058 | 11/1989 | France . | |
| 2079273 | 11/1991 | France . | |
| 35216 | 2/1990 | Japan | 384/513 |
| 1347997 | 4/1971 | United Kingdom . | |

*Primary Examiner*—Thomas R. Hannon

[57] ABSTRACT

A bearing unit for a vehicle wheel comprises a three-point or four-point bearing with an inner and an outer race, each with a bearing groove containing a series of rolling elements, which inner race has means for fixing to the suspension construction for the wheel. At least the outer race has a radially inward pointing bearing flange, which outer race bearing flange is provided with means for fixing a wheel thereto. The bearing unit can also be used for a driven front wheel comprising a constant-velocity joint, in which the outer ring of the joint has an external diameter which is at most equal to the internal diameter of the outer race, and is smaller than the internal diameter of the inner race. Because the joint is situated in the bearing, the bearing unit is compact.

29 Claims, 9 Drawing Sheets

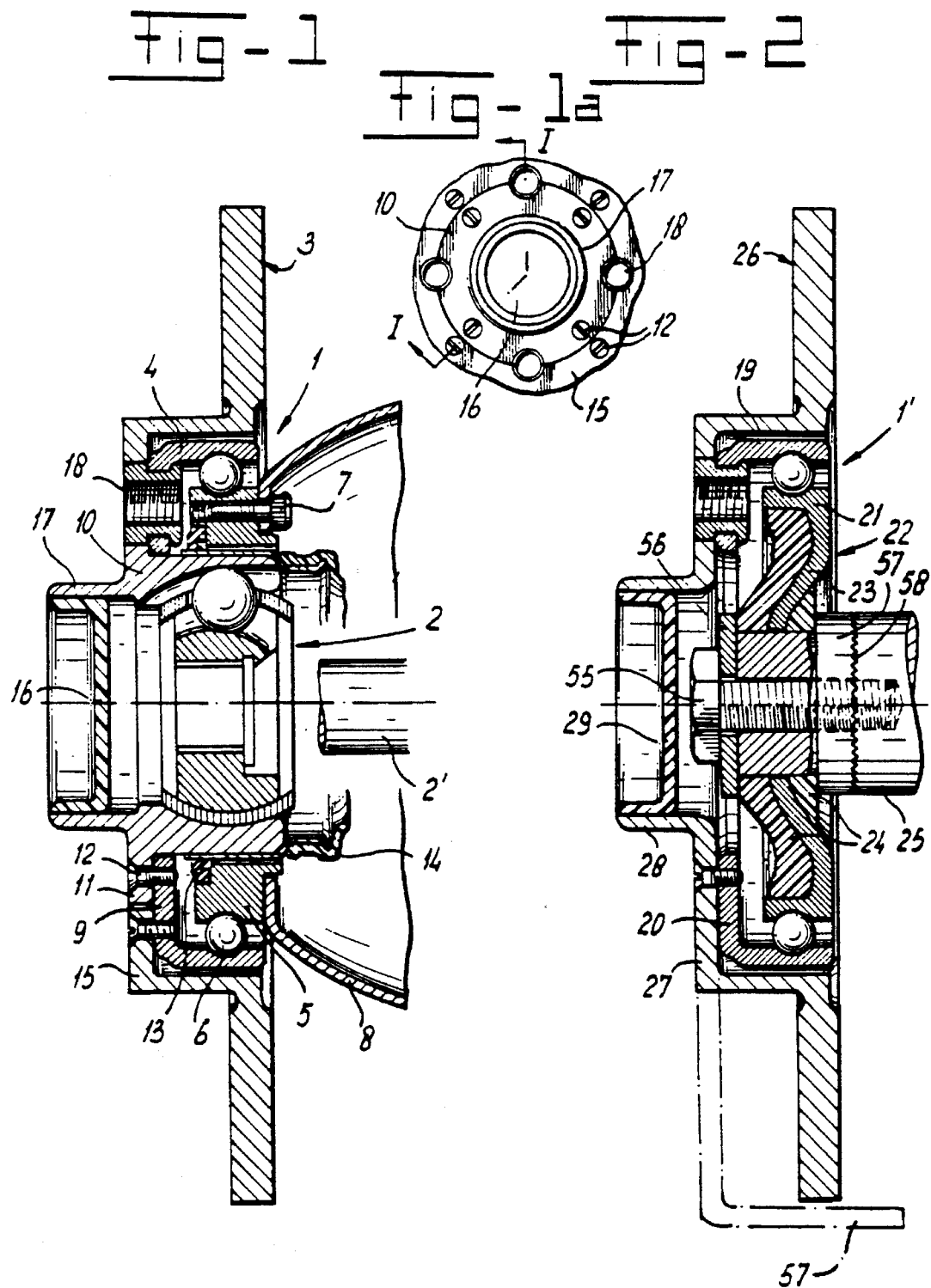

BEARING UNIT FOR A VEHICLE WHEEL

BACKGROUND OF THE INVENTION

The invention relates to a bearing unit for a vehicle wheel, comprising a three-point or four-point bearing with an inner and an outer race, each with a bearing groove containing a series of rolling elements, which inner race has means for fixing to the suspension construction for the wheel. Such bearing units are generally known. They can be used directly as a complete unit, which can also comprise, for example, a brake disc or drum and/or a constant-velocity joint. Attempts have recently been made to develop these bearing units further for use in modern motor cars.

The object of the invention is therefore to provide an improved bearing unit which has both a greater capacity and a greater versatility in potential applications. This object is achieved through the fact that at least the outer race has a radially inward pointing bearing flange, which outer race bearing flange is provided with means for fixing a wheel and/or drive means and/or brake means thereto. The inner race is thus stationary, while the outer race rotates. This arrangement ensures that the bearing unit according to the invention can be used in a number of widely differing ways.

According to a first possibility, the bearing unit can be used for a driven front wheel comprising a constant-velocity joint, in which case the outer ring of the joint has an external diameter which is smaller than the internal diameter of the inner race, and at most equal to the inner diameter of the outer race bearing flange. The constant-velocity joint is in this case largely accommodated in the bearing, which produces a compact construction.

SUMMARY OF THE INVENTION

In an economical embodiment, the outer race and the outer race bearing flange are integral and made of sheet steel.

The outer ring of the joint has an outward pointing coupling flange which is fixed to the outside of the outer race bearing flange facing away from the inner race, in such a way that the joint can be removed or fitted at the outside of the bearing. The outer ring of the joint is preferably fixed by means of bolts which are screwed into correspondingly threaded holes in the outer race bearing flange.

A brake disc or brake drum can also be fitted on the bearing unit in the same way. For this purpose, the brake disc or brake drum is provided with a fixing flange with a hole of which the diameter essentially corresponds to the diameter of the coupling flange, which brake disc or brake drum is also fixed to the outside of the outer race bearing flange. The brake disc or brake drum is also fixed by means of bolts which are screwed into correspondingly threaded holes in the outer race bearing flange.

The bearing flange, coupling flange and fixing flange of the brake disc or brake drum thus fixed to each other, together form a layered structure, which gives the bearing unit great rigidity and strength.

According to a second possibility, the bearing unit can be used for a non-driven wheel, in which case the inner race has a radially inward pointing bearing flange which is provided with means for fixing said flange to the supporting structure of a vehicle. The inner race and inner race bearing flange are preferably integral and made of sheet steel. Of course, also in a bearing unit for driven wheel such inner race bearing flange can be applied.

According to a third possibility, the bearing unit can also be used for a driven front wheel in which a constant-velocity joint can be fitted or removed at the inside of the bearing. For this purpose, an auxiliary ring is provided on the outer race bearing flange, which ring extends through the inner race and is provided with means for fixing the outer ring of a constant-velocity joint to it.

The auxiliary ring can have a tubular part with an internally unround cross-section, while the outer ring of the joint can have a stub with an externally correspondingly unround cross-section which fits without play in the tubular part. For fastening together the auxiliary ring and stub, the latter is provided with a threaded hole in which the shank of a bolt can be fixed, which bolt rests with its bolt head on the outside of a cap fixed to the bearing flange.

The auxiliary ring itself is fixed by means of an external auxiliary ring flange to the side of the bearing flange facing the inner ball race, for example by means of a number of wheel nut parts.

In case the inner race bearing flange is made up of steel and plastic layers, a hub with a considerable thickness measurement in the direction of the shaft is produced, which gives excellent support of the bearing unit. Here again, the rigidity and strength of the bearing unit can be even further increased if the brake disc or brake drum is fixed to the outside of the bearing flange.

The invention will be explained in greater detail below with reference to a number of examples of embodiments.

BRIEF DESCRIPTION OF THE DRAWINGS

FIG. 1 shows a first example of a bearing unit for a driven front wheel.

FIG. 1a shows a partial front view of FIG. 1,

FIG. 2 shows a first example of a bearing unit for a non-driven wheel.

DETAILED DESCRIPTION OF THE PERFORMED EMBODIMENTS

Figure 3:
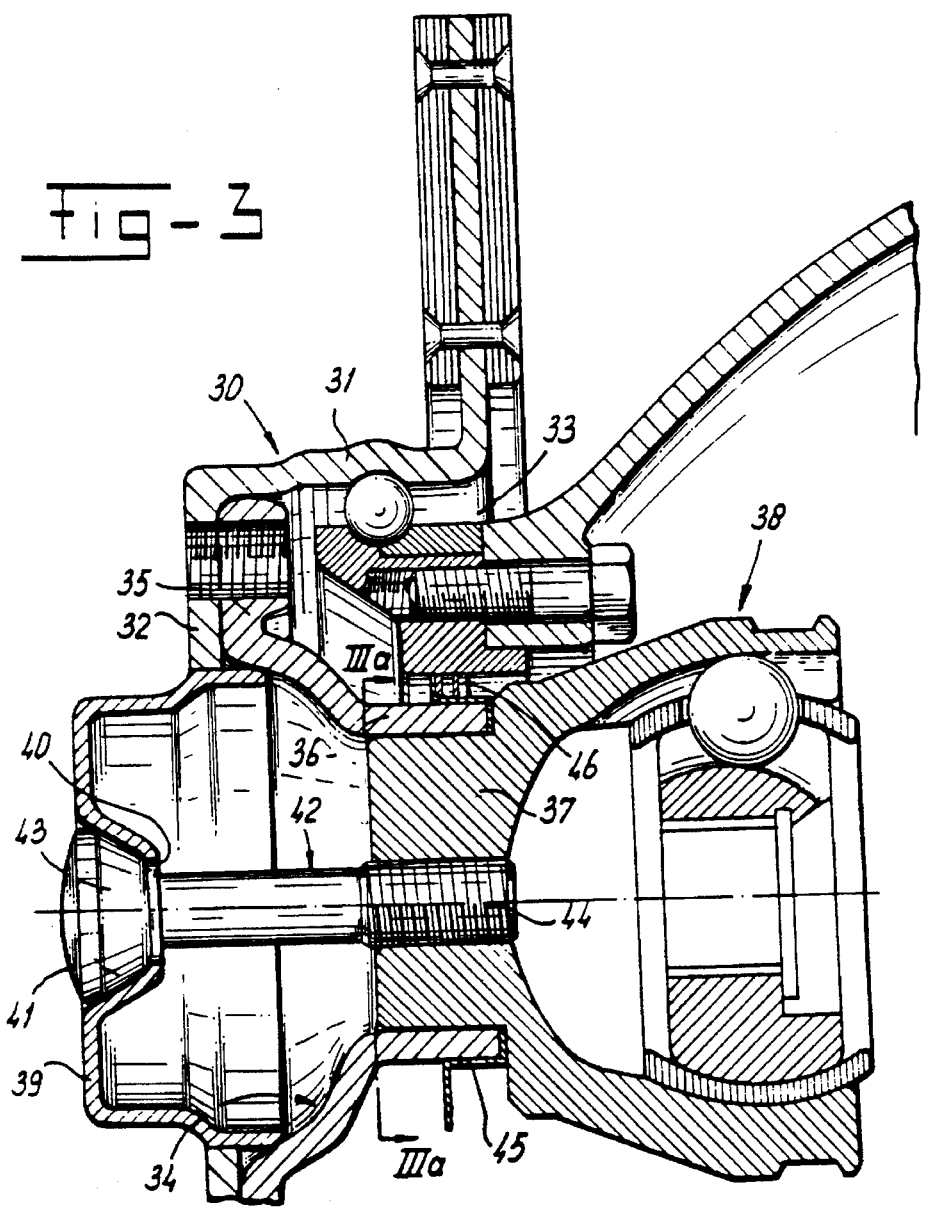
FIG. 3 shows a second example of a bearing unit for a driven front wheel.

The bearing unit shown in FIGS. 1 and 1a comprises a rolling bearing indicated in its entirety by 1, a constant-velocity joint indicated by 2, and a brake disc indicated by 3.

The rolling bearing 1 is a four-point bearing, and comprises an outer ball race 4, an inner ball race 5, and a single series of balls 6. The inner ball race 5 is stationary and is fixed by means of bolts 7, which are screwed into correspondingly threaded holes, to the suspension construction for a wheel indicated in the diagram by 8. By means of a cage (not shown), the balls are kept at regular spacings.

The outer ball race 4 is rotatable, and has a bearing flange 9 which is integral therewith. This bearing flange 9 points radially inwards, and encloses a hole of which the internal diameter is smaller than the internal diameter of the inner ball race 5.

The constant-velocity joint 2 can be inserted from the outside into this hole determined by the bearing flange 9. For this purpose, the outer ring 10 of this joint has an external diameter which is essentially the same as the internal diameter of the bearing flange 9. Joint 2 is also provided with a coupling flange 11, which rests against the outside of the bearing flange 9. The coupling flange is fixed to the bearing flange 9 by means of threaded bolts 12.

The gap between the ball race 5 and the outer ring 10 of the constant-velocity joint 2 is sealed by means of a slip ring 13 fixed on said inner ball race 5. A part of the bellows 14 forming the seal between the outer ring 10 and the partially shown drive shaft 15 is also shown. The brake disc 3 is also fixed by means of its fixing flange 15 to the bearing flange 9. The layered construction, which is formed by, on the one hand, the bearing flange 9 and, on the other, the coupling flange 11 and fixing flange 15 directly connecting to each other, gives the bearing unit excellent strength and rigidity properties.

The inside of the joint 2 is sealed off from the environment by means of cap 16, which is accommodated in the outer flange 17 moulded onto the outer ring 10.

Wheel nut parts 18, into which the fixing bolts for a wheel can be screwed, are also fixed in the bearing flange 9. At the places where these wheel nut parts 18 are provided, the coupling flange 11 and the fixing flange 15 of the brake disc 3 are provided with semi-circular recesses through which the wheel nut parts 18 project.

In the case of the exemplary embodiment for a non-driven wheel shown in FIG. 2 a bearing indicated in its entirety by 1' and of the same type as that discussed above is used. The outer ball race 19 again has a bearing flange 20, but the inner ball race 21 is fixed to shaft 25 by means of a composite flange 22, comprising, on the one hand, a layer of sheet steel which is integral with ball race 21 and, on the other, layers of plastic 24. Shaft 25 is provided for this purpose with a threaded hole into which bolt 55, which by means of supporting plate 56 holds the flange 22 on stub 25, is screwed. Stub 57 and shaft 25 cooperate by means of radially oriented teeth 58.

The brake disc 26 is connected to the bearing flange 20 by means of its fixing flange 27. This brake disc also has a moulded-on flange 28, into which the cover cap 29 is inserted. However, as an alternative, a brake drum 57 can also be fitted.

Figure 3A:
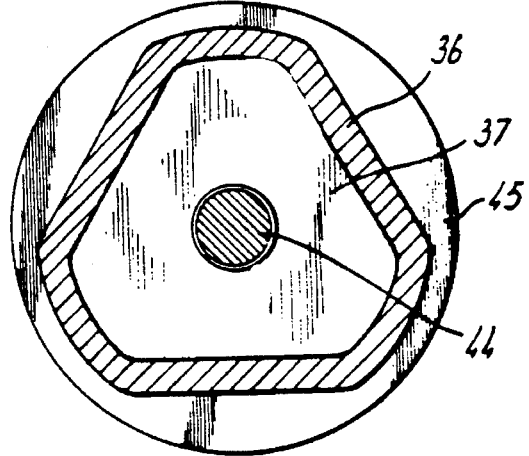
FIG. 3a shows a partial front view of FIG. 3.

In the case of the exemplary embodiment shown in FIGS. 3 and 3a for a driven front wheel, a bearing indicated in its entirety by 30 and having an outer ball race 31 with a bearing flange 32 is used. The inner ball race 33 is stationary, and can be fixed to a supporting construction not shown. This bearing 30 is also a four-point bearing.

In this embodiment an auxiliary ring, indicated in its entirety by 34, is fixed at the side of the bearing flange 32 facing the inner ball race 33. This auxiliary ring 34 comprises an auxiliary ring flange 35, which is fixed to the bearing flange 32. The auxiliary ring 34 also has a tubular part 36 with unround cross-section. The stub 37 with corresponding unround cross-section of the constant-velocity joint, indicated in its entirety by 38, is inserted into this tubular part 36.

A cover cap 39, which has a hole 40 and a supporting face 41 for a fixing bolt 42, is fixed in the hole determined by the bearing flange 32. Head 43 of bolt 42 rests against the supporting face 41, while the threaded shank 44 is screwed into a correspondingly threaded hole in stub 37.

In this variant of the bearing unit according to the invention the constant-velocity joint can thus be inserted at the inside of the bearing 30.

For sealing purposes, a sealing ring 45, against which a slip ring 46 fixed to the inner ball race 33 seals, is provided between the inner ball race 33 and the auxiliary ring 36 or constant-velocity joint 38.

Figure 4:
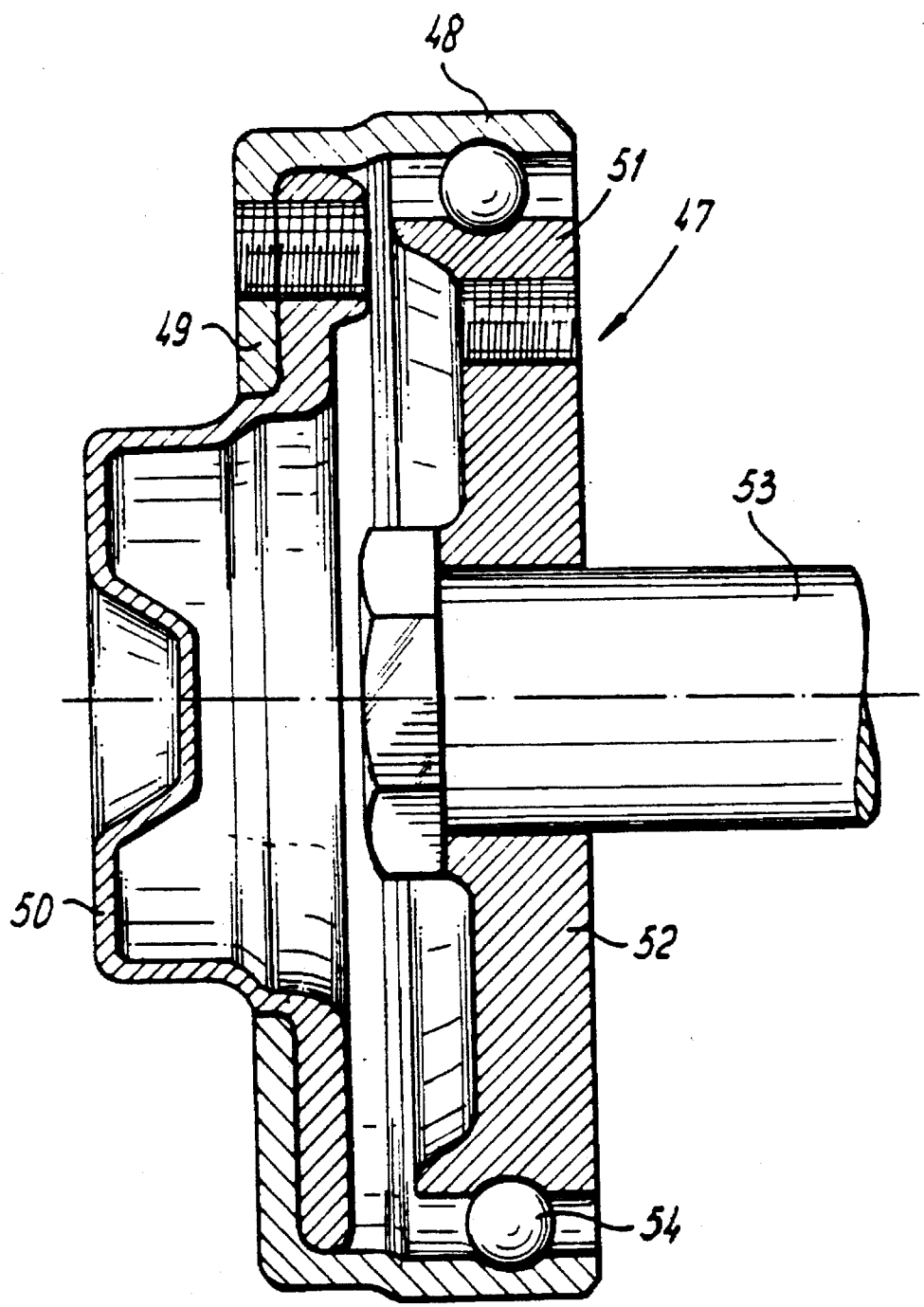
FIG. 4 shows a second example of a bearing unit for a non-driven wheel.
Figure 5:
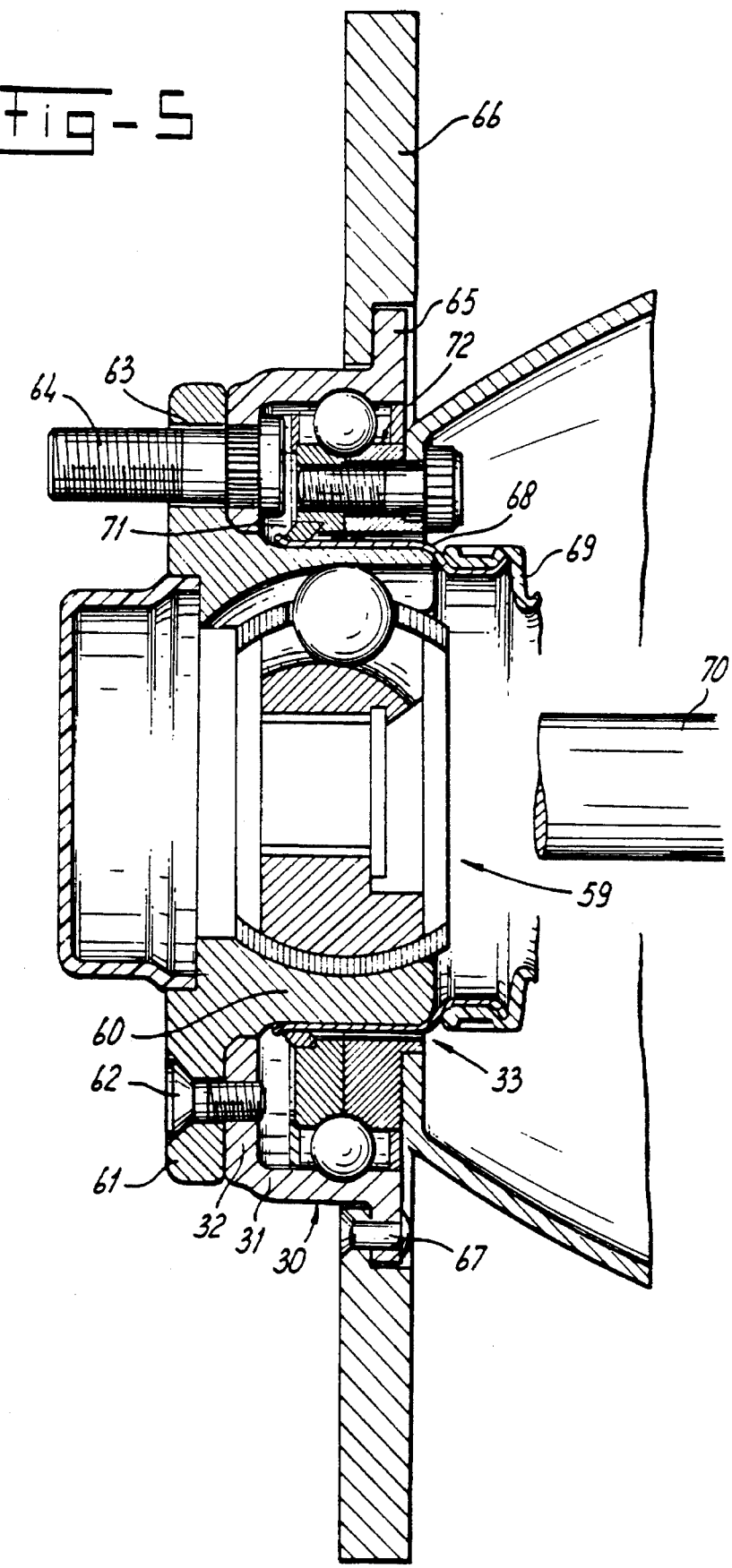
FIG. 5 shows a third example of a bearing unit for a driven wheel.

The variant of the bearing unit for a non-driven wheel shown in FIG. 4 has a bearing indicated in its entirety by 47 and provided with an outer ball race 48 with again a fixing flange 49. The sealing cap 50 is fixed to this fixing flange 49 in this embodiment. The inner ball race 51 is made of steel and is integral with fixing flange 52, by means of which bearing 47 is fixed on shaft 53.

This bearing 47 is also a four-point bearing, with a single row of balls 54. The inner ball race 51 can be provided with internally threaded holes, for an alternative fixing.

In the third embodiment of a bearing unit for a driven front wheel, the constant velocity joint 59 comprises an outer ring 60 having a radially outward pointing flange 61. By means of screws 62, this flange 61 is connected to the inwardly pointing flange 32 outer ball race 31 of the bearing 30. Also, holes 63 are provided in flange 61. Bolts 64, which are connected to flange 32 outer ball race 31, projects to the outside via these holes 63. Bolts 64 are intended for fixing a wheel to the bearing unit.

The outer ball race 31 furthermore comprises an outwardly pointing flange 65, onto which a disc brake 66 is connected by means of rivets 67.

The outer ring 60 carries a sealing ring 68, onto which a bellows 69 is fixed, the other end of which is fixed to shaft 70. A ring shaped seal 71, which is connected to the inner ball race 30, slidably cooperates with fixing ring 68 to prevent the ingress of contaminations.

Figure 6:
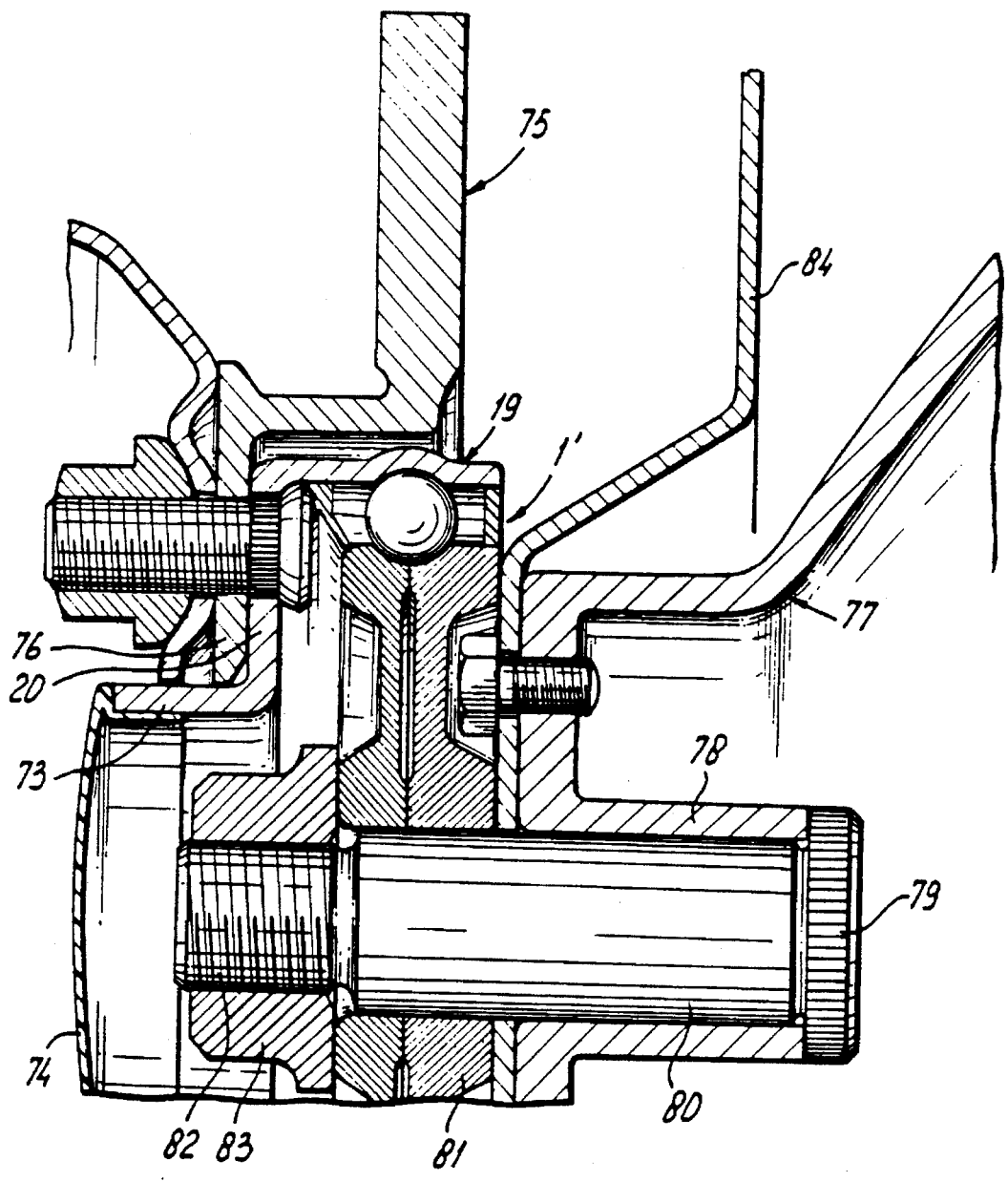
FIG. 6 shows a third example of a bearing unit for a non-driven wheel.

The third embodiment of a non-driven wheel shown in FIG. 6 contains a bearing 1', the outer ring 19 of which contains an outwardly pointing tubular part 73. Into this tubular part, a cap 74 is pressed. The disbrake unit 75 comprises an inwardly pointing flange 76, which is clamped onto the inwardly pointing flange 20 of bearing 1'.

The supporting structure 77 of the vehicle comprises an inwardly pointing tubular part 78, on the inner and of which the head 79 of pin 80 is resting. The pin 80 projects outwardly through a hole in the disc 81 which contains the inner ball race, and terminates in a screw threaded part 82 onto which a nut 83 is screwed.

Plate 84 is intended fop carrying the calliper parts (not shown) of the disc brake.

Figure 7:
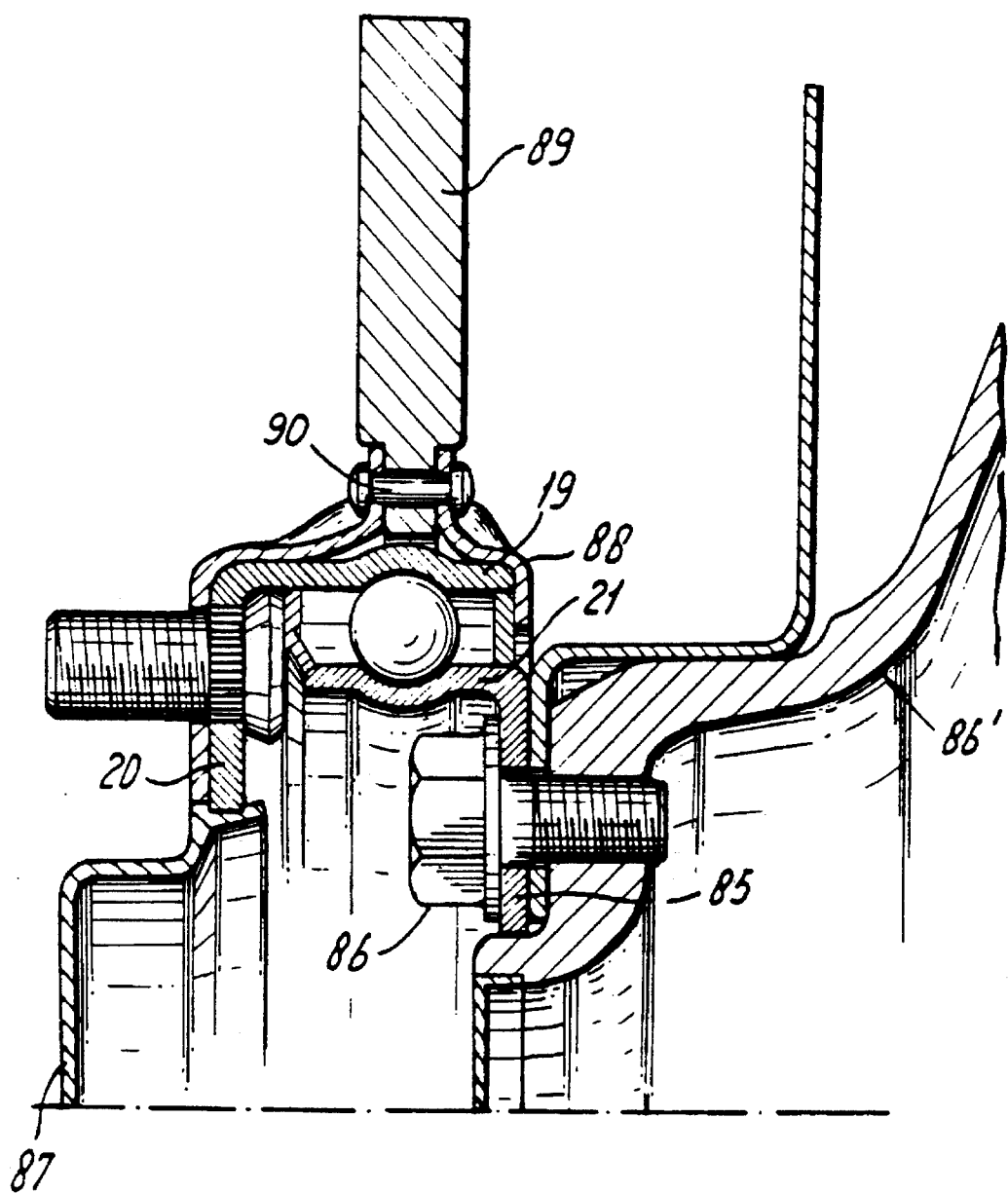
FIG. 7 shows a fourth example of a bearing unit for a non-driven wheel.

In the fourth embodiment of a bearing unit for a non-driven wheel shown in FIG. 7, both the outer ball race 19 as well as the inner ball race 21 have an inwardly pointing flange 20 respectively 85. By means of screw 86, the inwardly pointing flange 85 of inner ball race 21 is connected to the supporting structure 86' of a vehicle.

The outer ring 19 and its inwardly pointing flange 20 are covered by means of covers 87 and 88. These covers 87 and 88, together with disc brake 89, are connected to each other by means of rabbets 90 so as to form a steady, simple construction.

Figure 8:
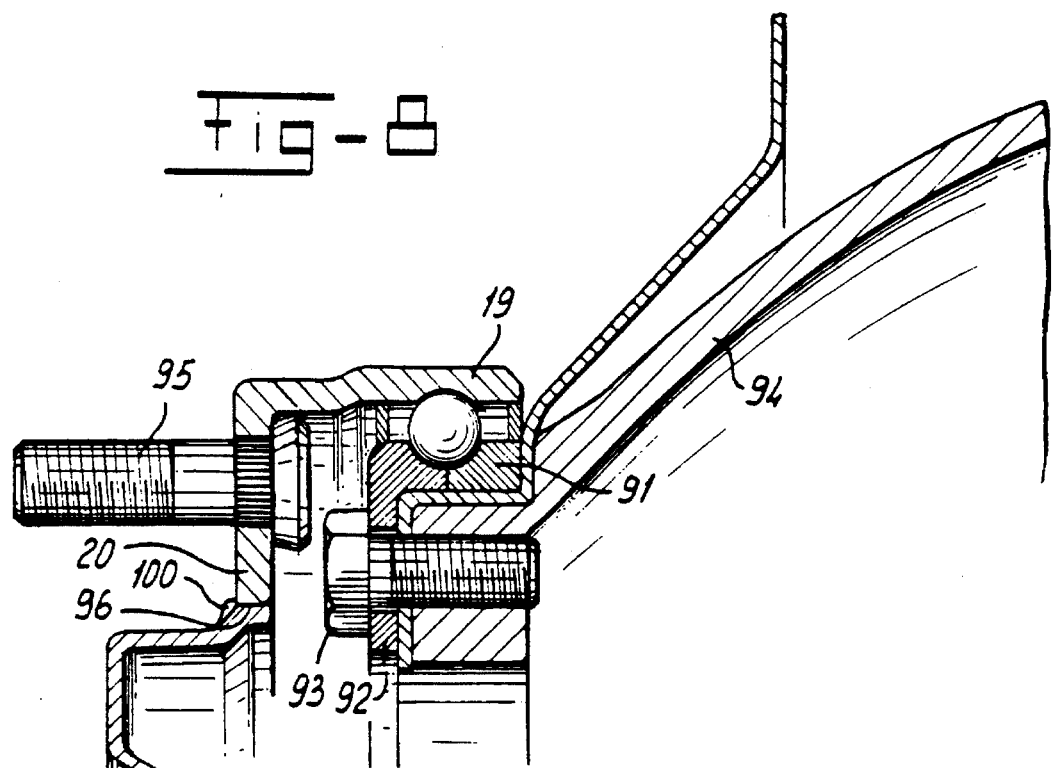
FIG. 8 shows a fifth example of a bearing unit for a non-driven wheel.
Figure 8A:
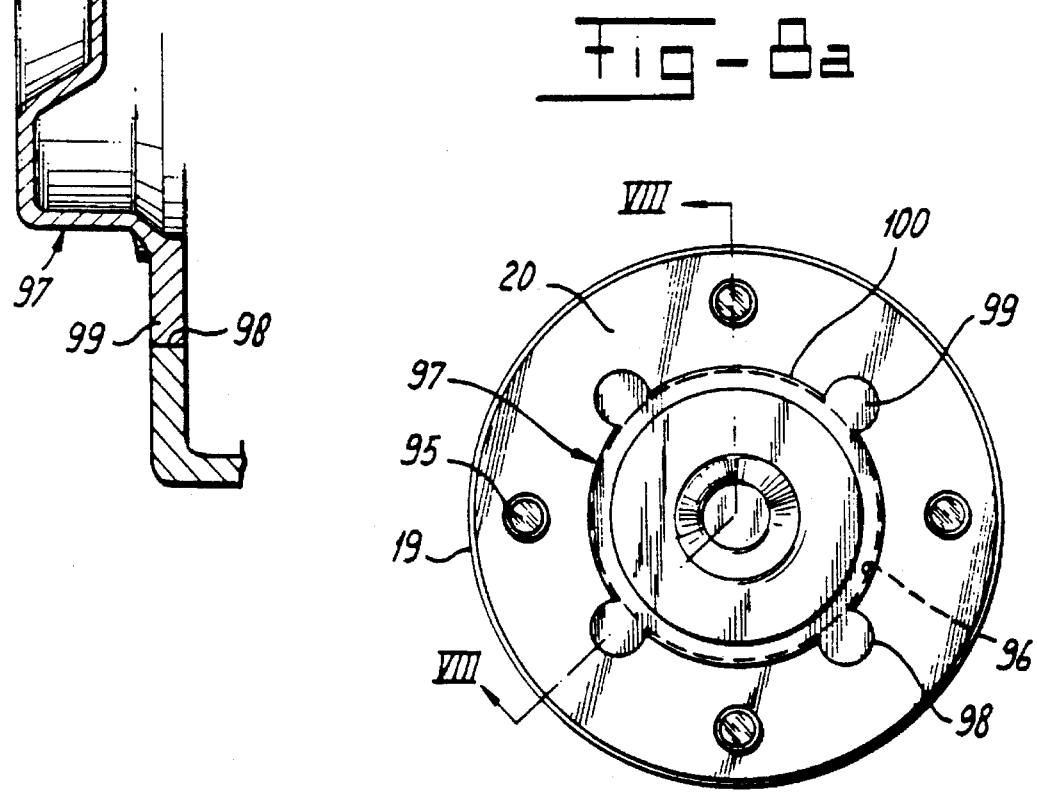
FIG. 8a shows a partial front view of FIG. 8.

The fifth embodiment of a bearing unit for a non-driven wheel shown in FIGS. 8 and 8a comprises an outer ball race 19 having an inwardly pointing flange 20, as well as an inner ball race 91 with an inwardly pointing flange 92. By means of bolts 93, this inwardly pointing flange 92 is connected to the supporting structure 94 of the vehicle. Flange 20 of outer ball race 19 carries bolts 95 for connection of a wheel.

As shown in FIG. 8a, flange 20 of outer ball race 19 comprises a hole 96, into which a cover 97 is fitted. Locally, hole 96 is widened by means of additional, smaller holes 98. By means of these holes, access can be gained to the head of bolts 93, in order to fix the bearing to the supporting structure 94 of a vehicle. Cap 97 has projections 99, the shape of which corresponds to the shape of the smaller holes 98. Also, cap 97 comprises a circumferential ridge 100, by means of which cap 97 rests onto the outside border of hole 96.

Figure 9:
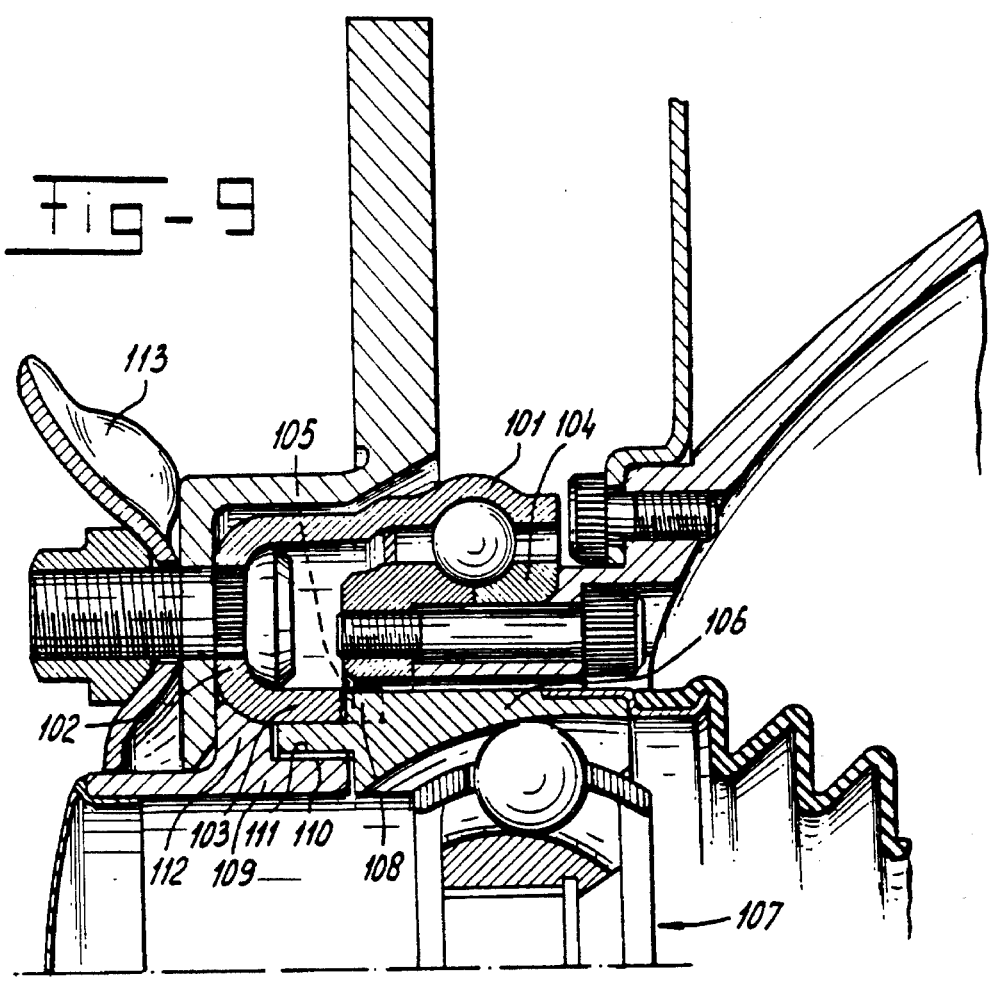
FIG. 9 shows a fourth example of a bearing unit for a driven wheel.
Figure 9A:
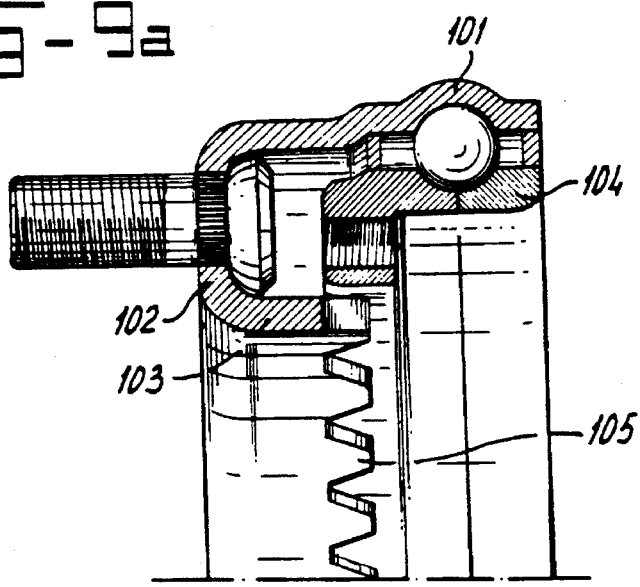
FIG. 9a shows a detail of FIG. 9.

The fourth example of a bearing unit for a front driven wheel shown in FIGS. 9 and 9a comprises an outer ball race 101, having a radially inwardly pointing flange 102, as well as a further flange 103 which connects to flange 102 and which in axial direction points inwardly, towards or past the ball race 104. As shown in FIG. 9a, the inner edge of flange 103 carries teeth 105, which projects in axial direction as well. The outer ring 106 of constant-velocity joint 107 has corresponding teeth 108, which closely fit in teeth 105 of flange 103 of outer ball race 101.

Outer ring 106 of constant-velocity joint 107 is connected to flange 103 of outer ball race 101 by means of connecting piece 109, which carries an outer screw thread 110. This outer screw thread 110 cooperates with inner screw thread 111 of outer ring 106 of constant-velocity joint 107.

Furthermore, connecting piece 109 comprises a radially outwardly projecting flange 112, the outer circumference of which is shaped in correspondence to the transition of the flange 102 and flange 103 of the outer ball race 101. By screwing the connecting piece 109 onto the outer ring 106 of the constant-velocity joint 107, teeth 105 and 108 are tightly drawn towards each other, thus ensuring a reliable, torsionally stiff connection between the constant-velocity joint 107 and the inner ball race 103 with wheel 113.

Figure 10:
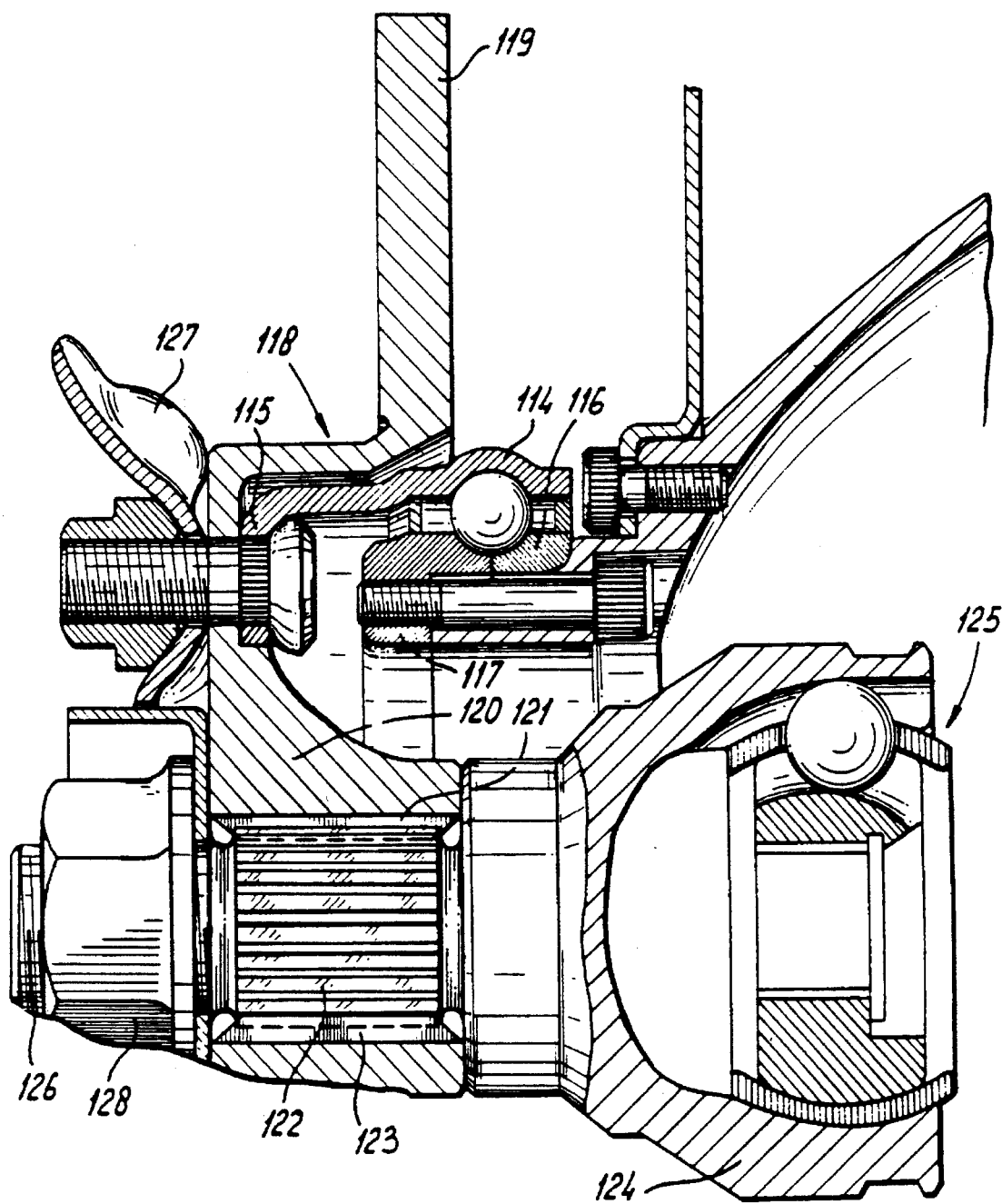
FIG. 10 shows a fifth example of a bearing unit for a driven wheel.

The fifth embodiment of a bearing unit for front driven wheel, shown in FIG. 10, comprises a bearing with an outer ring 114, having an inwardly pointing flange 115. The inner ring 116 comprises an inwardly pointing flange 117 as well.

Furthermore, a connecting piece 118 has been provided, which comprises a disc brake part 119, and a connecting part 120. By means of bolts (not shown) connecting piece 118 is connected onto flange 115 of outer ring 114.

Connecting part 120 comprises a hole with radially inwardly pointing teeth 121, which cooperate with radially outwardly pointing teeth 122 of a stub 123 carried by the outer ring 124 of constant-velocity joint 125. The stub 123 also carries a screw threaded end 126, onto which a nut 128 screw is screwed. This nut 127 bears against the outside of connecting piece 118, thus ensuring a sturdy and stiff connection between constant-velocity joint 125 and wheel 127.

We claim:

1. Bearing unit for a vehicle wheel, comprising a three-point or four-point bearing with an inner and an outer race, each with a single bearing groove containing a single series of rolling elements, which inner race has means for fixing to the suspension construction for the wheel, characterised in that at least the outer race has a radially inward pointing bearing flange, which outer race bearing flange is provided with fixing means for fixing a wheel or drive means or brake means thereto.

2. Bearing unit according to claim 1, in which the outer race and the outer race bearing flange are integral and made of sheet steel.

3. A bearing unit according to claim 1 where said inner race has an internal diameter $D_1$, and said outer race flange has an inner diameter $D_2 < D_1$, said bearing unit further comprising a constant velocity joint including an outer ring which has an external diameter $D_3$ coupled for rotation with said outer race flange, where $D_3 < D_1$ and $D_3 \leq D_2$.

4. Bearing unit according to claim 3, in which the outer ring of the joint has an outward pointing coupling flange which is fixed to the outside of the outer race bearing flange facing away from the inner race, in such a way that the joint can be removed or fitted at the outside of the bearing.

5. Bearing unit according to claim 4, in which the outer ring of the joint is fixed by means of bolts which are screwed into correspondingly threaded holes in the outer race bearing flange.

6. Bearing unit according to claim 5, in which the outer ring of the joint bears a ring in which a cover cap can be accommodated.

7. Bearing unit according to claim 3, wherein said brake means comprises a brake disc or brake drum having a fixing flange with a hole of which the diameter essentially corresponds to the diameter of the coupling flange, which brake disc or brake drum is also fixed to the outside of the outer race bearing flange.

8. Bearing unit according to claim 7, in which the brake disc or brake drum is fixed by means of bolts which are screwed into correspondingly threaded holes in the outer race bearing flange.

9. Bearing unit according to claim 3, in which a brake disc or brake drum is provided, having a fixing flange with a hole the diameter of which essentially corresponds to the outer diameter of the outer race which outer race also has an outward pointing supporting flange to which the fixing flange is fixed.

10. Bearing unit according to claim 9, in which wheel bolt parts are fixed in the outer race bearing flange, and the coupling flange of the joint is provided with recesses for the wheel bolt parts.

11. Bearing unit according to claim 1, in which the inner race has a radially inward pointing bearing flange which is provided with means for fixing said flange to the supporting structure of a vehicle.

12. Bearing unit according to claim 11, in which the inner race and inner race bearing flange are integral and made of sheet steel.

13. Bearing unit according to claim 11 in which a brake disc or brake drum, which is fixed to the outside of the outer race bearing flange, is provided.

14. Bearing unit according to claim 13, in which the brake disc or brake drum is fixed by means of bolts which are screwed into correspondingly threaded holes in the outer race bearing flange.

15. Bearing unit according to claims 11 or 12, in which a brake disc or brake drum is provided, having a fixing flange with a hole the diameter of which essentially corresponds to the outer diameter of the outer race, which outer ball race also has an outward pointing supporting flange to which the fixing flange is fixed.

16. Bearing unit according to claims 7, 8, 13 or 14, in which wheel nut parts are fixed in the bearing flange, and the fixing flange of the brake disc or the coupling flange of the joint are provided with recesses for the wheel nut parts.

17. Bearing unit according to claims 11, in which the inner race bearing flange is provided with plastic filling on both sides.

18. Bearing unit according to claim 1 for a driven front wheel, comprising a constant-velocity joint, in which an auxiliary ring is provided on the outer race bearing flange, which ring extends towards or through the inner race and is provided with means for fixing the outer ring of a constant-velocity joint to it, in such a way that the joint can be fitted or removed at the inside of the bearing.

19. Bearing unit according to claim 18, in which the auxiliary ring has a tubular part with an internal unround cross-section, and the outer ring of the joint has a stub with an externally correspondingly unround cross-section which fits without play in the tubular part.

20. Bearing unit according to claim 19, in which the stub is provided with a threaded hole in which the shank of a bolt can be fastened, which bolt rests with its bolt head on the outside of a cap fixed to the outer race bearing flange.

21. Bearing unit according to claims 18, 19 or 20, in which the ring is a separate auxiliary ring having an external auxiliary ring flange which is fixed to the side of the outer race bearing flange facing the inner race.

22. Bearing unit according to claim 20, in which the outer race bearing flange and the auxiliary ring flange are fixed to each other by means of a number of wheel nut parts.

23. Bearing unit according to claim 19, in which the tubular part and stub have co-operating radial teeth, and the stub is provided with a screw threaded end which projects beyond the tubular part, onto which screw threaded end a nut is provided which bears against the side of the tubular part facing away from the inner race.

24. Bearing unit according to claim 18, in which the ring has a cylindrical part with axial teeth, which teeth co-operate with facing, corresponding axial teeth provided on the outer ring of the constant-velocity joint.

25. Bearing unit according to claim 24, in which a fixing ring is provided which rests onto the side of the outer race bearing flange facing away from the inner race, and which fixing ring is provided with a screw threaded part which co-operates with a corresponding screw threaded part on the outer ring of the constant-velocity joint.

26. Bearing unit according to claim 18, in which the auxiliary ring on the outer race bearing flange is welded to the outer ring of the constant velocity joint.

27. A bearing unit for a vehicle wheel comprising a three-point for four-point bearing with an inner and an outer race, each with a bearing groove containing a series of rolling elements, which inner race has means for fixing to the suspension construction for the wheel, characterized in that at least the outer race has a radially inward pointing bearing flange, which outer race bearing flange is provided with fixing means for fixing a wheel or drive means or brake means thereto, and a constant-velocity joint in which the outer ring of the joint has an external diameter coupled for rotation with said outer race flange, and where said external diameter is smaller than the internal diameter of the inner race and at most is equal to the inner diameter of the outer race bearing flange, and where the outer ring of the joint has an outward pointing coupling flange which is fixed to the outside of the outer race bearing flange facing away from the inner race, in such a way that the joint can be removed or fitted at the outside of the bearing.

28. A bearing unit according to claim 27, in which the outer ring of the joint is fixed by means of bolts which are screwed into correspondingly threaded holes in the outer race bearing flange.

29. A bearing unit according to claim 27, in which the outer ring of the joint bears a ring in which a cover cap can be accommodated.

* * * * *